(12) United States Patent
Mishne et al.

(10) Patent No.: US 10,579,635 B1
(45) Date of Patent: Mar. 3, 2020

(54) REAL TIME SEARCH ASSISTANCE

(71) Applicant: Twitter, Inc., San Francisco, CA (US)

(72) Inventors: Gilad Mishne, San Francisco, CA (US);
Zhenghua Li, San Francisco, CA (US);
Aneesh Sharma, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 941 days.

(21) Appl. No.: 15/063,360

(22) Filed: Mar. 7, 2016

Related U.S. Application Data

(60) Provisional application No. 62/129,383, filed on Mar. 6, 2015.

(51) Int. Cl.
*G06F 16/2458* (2019.01)
*G06F 16/332* (2019.01)
*G06F 16/33* (2019.01)

(52) U.S. Cl.
CPC ...... *G06F 16/2477* (2019.01); *G06F 16/3323* (2019.01); *G06F 16/3334* (2019.01)

(58) Field of Classification Search
None
See application file for complete search history.

(56) References Cited

U.S. PATENT DOCUMENTS

2008/0071740 A1* 3/2008 Jhala .................... G06F 16/951
2010/0161643 A1* 6/2010 Gionis .............. G06F 16/24534
707/765

OTHER PUBLICATIONS

Mishne, et al., "Fast Data in the Era of Big Data: Twitter's Real-Time Related Query Suggestion Architecture", Twitter, Inc. http://engineering.twitter.com/2012/05/related-queries-and-spelling.html, Oct. 27, 2012, 11 pages.

* cited by examiner

*Primary Examiner* — Amresh Singh
(74) *Attorney, Agent, or Firm* — Cesari and McKenna, LLP

(57) ABSTRACT

A system and method for providing real-time search assistance is provided. Incoming queries are analyzed and an in core set of query statistics is maintained to enable a current suggestion list to be generated. By analyzing each query as it occurs, the suggestion list and associated data stores may be updated in substantially real-time to enable suggestions to be available at the same time as new messages are occurring relating to the subject of the query.

18 Claims, 7 Drawing Sheets

| | |
|---|---|
| QUERY | 305 |
| COUNT | 310 |
| WEIGHTED COUNT | 315 |
| DECAYED COUNT | 320 |
| LAST SEEN | 325 |
| ⋮ | 330 |

FIG. 3

| INPUT (USER, QUERY, TIMESTAMP) | USER SESSION STORE | QUERY STORE | CO-OCCUR STORE |
|---|---|---|---|
| (1, A, 100) | 1→(A) | A→1 | |
| (1, B, 101) | 1→(A, B) | A→1<br>B→1 | (A, B)→1 |
| (1, B, 102) | 1→(A, B, B) | A→1<br>B→2 | (A, B)→2 |
| (2, A, 102) | 1→(A, B, B)<br>2→(A) | A→2<br>B→2 | (A, B)→2 |
| (2, B, 103) | 1→(A, B, B)<br>2→(A, B) | A→2<br>B→3 | (A, B)→3 |
| (2, C, 101) | 1→(A, B, B)<br>2→(C, A, B) | A→2<br>B→3<br>C→1 | (A, B)→3<br>(C, A)→1<br>(C, B)→1 |
| DECAY/PRUNE | 1→(A, B, B)<br>2→(C, A, B) | A→1<br>B→1.5 | (A, B)→1.5 |
| (1, A, 105) | 1→(B, B, A)<br>2→(C, A, B) | A→2<br>B→1.5 | (A, B)→1.5<br>(B, A)→1 |
| (1, C, 106) | 1→(B, A, C)<br>2→(C, A, B) | A→2<br>B→1.5<br>C→1 | (A, B)→1.5<br>(B, A)→2<br>(B, C)→1<br>(A, C)→1 |

FIG. 6

REAL TIME SEARCH ASSISTANCE

CROSS-REFERENCE TO RELATED APPLICATIONS

The present application claims the benefit of U.S. Provisional Patent Application Ser. No. 62/129,383, which was filed on Mar. 6, 2015, by Gilad Mishne, et. al. for System and Method for Real Time Search Assistance, which is hereby incorporated by reference.

BACKGROUND

The instant specification relates to digital information retrieval in the context of social media.

Search systems typically include spell correction and query suggestion components to refine queries submitted by users, including those submitted by human operators. These components are usually distinct in that they leverage different heuristics and signals, with the latter often relying on, for example, n-grams to build its knowledge base of terms, conventionally implemented as thesauruses and dictionaries. Such n-gram processing are complex and can involve large volumes of data and hence require days or even weeks to complete, only after which can the system's thesauruses and dictionaries be updated.

In operation, the spell correction component corrects spelling errors detected in a submitted query, and the query suggestion component selects one or more synonyms of one or more key terms included in the submitted query. Spelling corrections and synonyms can be suggested to the human operator as she is typing the query. Regardless of whether spell corrections and query suggestions are implemented as the query is being typed or after the entire query has been submitted to the system, alternative queries are generated by the spell correction and query suggestion components and are processed in parallel with the submitted query against one or more search indices, and their results are combined and provided as search results.

With social media, information is more real-time in nature than what typically happens with Web pages on the Internet. Events of popular interest (for example, a compelling Super Bowl commercial or an especially nasty celebrity feud or a goal in a World Cup football match) can have short lives on a social media platform, where social media messages directed at and interest about the event can spike and diminish or even disappear completely within minutes.

SUMMARY

The instant specification describes methods and systems for implementing a search assistance that updates its knowledge base of terms in real-time and hence is sufficiently quick to be able to process queries submitted in search of short lived information and resources on social media platforms. In one implementation, the system crowd sources co-occurrences of terms across its user base and weights co-occurrences by any combination of popularity, frequency, and freshness. The more popular term co-occurrences, those that are more frequent, and those that are more recent are given more weight. Moreover, the system prunes its knowledge base of terms based on term co-occurrences that are less popular, less frequent, and stale so that computational resources require to implement real-time updates (for example, as its user base is submitting queries) to its knowledge based of terms is not prohibitively expensive and, more importantly, so that the updates have extremely low latency.

Figuratively speaking, system leverages the described signals to detect a warping of topicality space in where two terms, which beforehand were logically distant, are suddenly sufficiently close to be relevant to each other. This situation can arise when, for example, a popular comedian parodies a rising political figure and creates and submits or inspires users to create and submit social messages linking the two.

In one implementation, a system and method for enabling real time search assistance is based on rapidly identifying co-occurrences between searched terms among the users of a system. By intelligently deciding what to prune from in-memory data stores and what not to prune, the information stored within the search assistance system retains real time relevance in that update intervals are minimal, e.g., after each new query. This enables the entire universe of users to effectively crowdsource the relationship between non-associated terms.

Should a well respected user of the system generate content providing a relationship between two terms, the system may weight that to enable other users to quickly see the respected user's generated relationship among the terms. By weighting queries based on various factors, the system enables rapidly occurring events to be quickly identified and linked, thereby enabling more relevant search assistance to users. Further, as additional queries containing the co-occurring terms are received, the weighted value is increased, thereby preventing the terms from being pruned. This enables very rapid escalation of values related to terms that are being queried in substantially real time, e.g., in response to a major event. As time passes and the number of queries declines, the co-occurring terms will be pruned.

As described in more detail below, the disadvantages of the prior art are overcome by providing technique for crowdsourcing real time search assistance. A search assistance module, executing as part of a messaging system application, maintains a list of search suggestions to rapidly provide responses to a user query. In operation, a new query is received by, e.g., a user entering a search term, a user selecting a term, etc. In response to the new query being received, the query is examined and a user session store, a query store and a co-occurrence store are updated to reflect the query. More generally, the real time search assistance enables a system to capture relationships between non-associated terms that have recently become associated due to, e.g., large numbers of users generating content and/or searching for content using the terms. Further, as the system only examines the terms in the query, but does not look into the meanings behind the terms, the updates may occur rapidly.

Although session information more sophisticated than those that are time based can be implemented, when there are sufficient computing resources, to help detect multi-topic sessions (e.g., when a user searches for more than one topic of interest during one sitting) and distinguish queries directed at different topics in these sort of sessions, such session information is not required to prevent erroneous association of unrelated terms. This is the case because the system described herein distinguishes topics in a series of multi-topic searches by accounting for the popularity of term co-occurrences. Because it is unlikely that there would be a significant number of people searching for the same two topics in one sitting, i.e., the term co-occurrences are not popular across the systems user base, the system appropriately computes the weights for these sorts of term cooccurrences so that terms so associated are unlikely to be included in the system's knowledge base of terms, as will be further explained below. Advantageously, the system need not implement computing resources that would increase latency needed to update its knowledge base of terms.

The query store maintains a list of queries as well as count values indicative of the number of times the query has recently occurred. Similarly, the co-occurrence store is used to maintain a list of co-occurring queries, i.e., queries that occur prior to or after each other. The search assistance module utilizes the query and co-occurrence stores to identify suggestions that are stored in a current suggestions list. At routine intervals, a decay rule set is applied to the various data stores to reduce the count values associated with each entry.

Should an entry's count value fall below a threshold, the entry is pruned or removed from the appropriate data store. In contrast, as long as users are generating co-occurrences and the co-occurrence's count remains above a pre-defined threshold, it will remain in the data store. In this way, the size of the data stores may be limited to enable storage in memory, thereby resulting in faster data access. By storing the data stores in memory, and updating account related to query entries after each query, the suggestions provided may be updated in substantially real time. This enables the system to provide information relating to a large population of users' reacting very quickly to real time events.

This provides a noted advantage over prior art systems which may have a substantial time lag between the appearance of a significant number of queries related to a topic and the integration of that topic into the search suggestion.

In operation, when a user enters a query, the current suggestion list is examined to identify suggested queries that relate to the entered query. Examples of suggested queries may be the correction of a common typographical error in the query, alternative terminology related to the query and/or queries that are subject matter related to the initial query. The system processes the query by performing the action that was to be initiated by execution of the query as well as updating the various data stores as a result of the new query or selection of the suggestion. In this manner, the various query related data stores are updated in substantially real time on a per query basis.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 3 is a schematic block diagram of an example query entry data structure in accordance with an illustrative embodiment of the present disclosure;

FIG. 6 is an example chart showing changes to data structures in response to various inputs in accordance with an illustrative embodiment of the present disclosure.

DETAILED DESCRIPTION OF AN ILLUSTRATIVE

Embodiment

Figure 1:
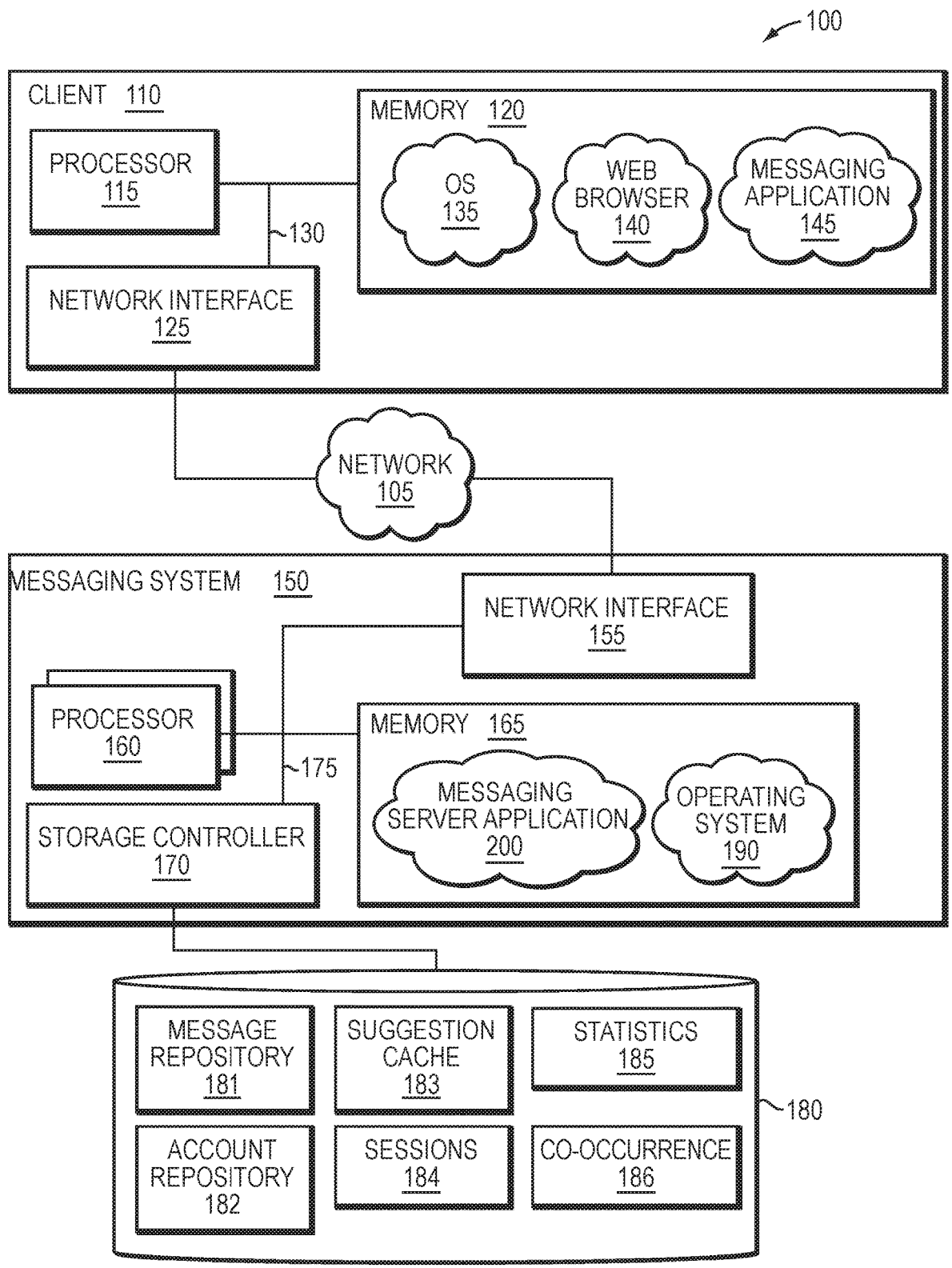
FIG. 1 is a schematic block diagram of an example computing environment in accordance with an illustrative embodiment of the present disclosure.

FIG. 1 is a schematic block diagram of an example computing environment 100 in accordance with an illustrative embodiment of present disclosure. Computing environment 100 is illustratively centered around a computer network 105. A computer network is a geographically distributed collection of entities interconnected by communication links and segments for transporting data between end nodes, such as personal computers, workstations, mobile devices etc. Many types of networks are available, ranging from Wi-Fi networks, cellular telephone networks, local area networks (LANs) to wide area networks (WANs). Wi-Fi is a mechanism for wirelessly connecting a plurality of electronic devices (e.g. computers, cell phones, etc.). A device enabled with Wi-Fi capabilities may connect to the Internet via a wireless network access point, as known to those skilled in the art. Cellular networks are radio networks distributed over large areas called "cells", wherein each cell may be served at least one fixed-location transceiver known as a cell site or base station. When joined together, these cells may provide radio coverage over a wide geographic area. As known by those skilled in the art, this may enable a large number of portable transceivers (e.g., mobile phones), to communicate with each other. LANs typically connect the entities over dedicated communication links located in the same general physical location, such as a building or a campus. WANs, on the other hand, typically connect geographically dispersed entities for long-distance communication links, such as common carrier telephone lines, optical light paths, synchronous optical network (SONET), or synchronous digital hierarchy (SDH) links. The Internet is an example of a WAN that connects disparate networks throughout the world, providing global communication between entities on various networks. The entities typically communicate over the network by exchanging discrete frames or packets of data according to predefined protocols, such as Transmission Control Protocol/Internet Protocol TCP/IP, Hypertext Transfer Protocol (HTTP), etc. In this context, a protocol consists of a set of rules defining how the entities interact with each other and how packets and messages are exchanged.

The computer network 105 is illustratively displayed as a single network. However, in alternative embodiments of the disclosure, the network 105 may comprise a plurality of differing networks operatively interconnected. For example, a cellular network may be operatively connected with one or more LANs and/or a WAN. As such, the description of network 105 being a single network should be taken as a example only.

Illustratively, the client 110 comprises a processor 115, memory 120 and network interface 125 operatively interconnected via a system bus 130. The client 110 also illustratively comprises one or more input/output devices (not shown). The I/O devices may comprise a variety of types depending on the form factor of the client 110. For example, when the client 110 comprises a cellular telephone, the I/O device may comprise a touch screen. However, in an alternative embodiment, the client 110 may comprise a personal computer. In such an alternative embodiment, the I/O device may comprise of a computer display monitor, keyboard and/or mouse. As will be appreciated by those skilled in the art, the type of I/O device utilized for a particular client may be a matter of design choice.

The processor 115 may comprise the necessary elements and/or logic adapted to execute software programs and/or manipulate data structures. Various data structures are illustrated in the accompanying figures. It should be noted that such figures are logical representations of data being stored. In accordance with various embodiments of the present disclosure, a data container may be implemented as an array, a tree, a hash table, etc. More generally, a data structure is any construct, however implemented, stored and/or organized, that enables data to be stored, retrieved and searched. In alternative embodiments, the processor 115 may comprise a plurality of separate processors. Thus, the description of a single processor 115 should be taken as example only. The memory 120 may comprise any form of storage adaptable for use on a client 110. Examples of memory may include, for example, a volatile random access memory, removable media, flash RAM, etc. Thus, the term memory 120 should be taken to include any form of storage that is suitable for use with client 110. Memory 120 illustratively stores an operating system 135, a web browser 140 and/or a messaging application 145. The operating system 135 may comprise a mobile operating system such as the Android operating system available from Google Inc., the WOS operating system available from Apple, Inc., etc. or may comprise of a personal computer-based operating system such as Microsoft Windows available from Microsoft Corporation or MacOS available from Apple, Inc. Further, in alternative embodiments, operating system 135 may comprise a dedicated or custom-built operating system. Thus, the operating system 135 should be construed broadly to encompass any software that organizes and manages the basic operations of client 110.

The web browser 140 illustratively provides access to the messaging system 150 via network 105. The messaging application 145 may comprise of a dedicated application enabling access to messages on the messaging system 150 or, in alternative embodiments, the messaging application 145 may comprise a module integrated into another application to provide a functionality to send/receive messages to messaging system 150. As such, the description of messaging application 145 being a standalone application should be taken as example only.

The network interface 125 illustratively contains the mechanical, electrical and signaling circuitry for transmitting/receiving data over a network, such as a cellular network and/or Wi-Fi network. The network interface 125 may be configured to transmit and/or receive data using a variety of different communication protocols, including, inter alia, TCP/IP, UDP, ATM, SONET, HTTP, wireless protocol such as 802.11, frame relay, Ethernet, fiber distributed data interface (FDDI), etc. Notably, the network interface 125 may also be used to implement one or more virtual private interfaces, such as a virtual private network (VPN) access, as is known to those skilled in the art. Further, it should be noted that a single network interface 125 is shown for illustrative purposes. In alternative embodiments, a plurality of network interfaces 125 may be utilized, each directed to a differing format. For example, in a mobile device embodiment, a first network interface 125 may be directed to the cellular network, while a second network interface 125 provides Wi-Fi access. Thus, a single network interface being shown should be taken as example only.

The messaging system 150 illustratively comprises a network interface 155, processor 160, a memory 165 and a storage controller 170 operatively interconnected by a system bus 175. The network interface 155 functions similarly to network interface 125. As noted above in relation to network interface 125, the network interface 155 may comprise a plurality of differing network interfaces. For example, the network interface 155 may comprise a cellular network interface, a Wi-Fi interface, or a combination thereof. The processor 160, similar to processor 115, illustratively comprises the necessary elements and/or logic adapted to execute software programs and manipulate data structures. In messaging system 150, the processor 160 may be implemented as a plurality of processors, such as a multi-processor computer system. Thus, the description of processor 160 being a singular processor should be taken as example only.

The memory 165 illustratively stores software for execution on the processor 160 including, for example, an operating system 190 and a messaging server application 200, described further below in reference to FIG. 2. The operating system 190 illustratively organizes the messaging system 150 and provides conventional operating system functionality to other applications executing thereon. The storage controller 170 illustratively comprises the necessary mechanical and electrical functionality to interconnect with one or more storage devices 180. In accordance with an illustrative embodiment of the present disclosure, storage devices 180 may comprise one or more disk drives operatively interconnected with the messaging system. Such drives may be arranged in a RAID array or other redundant system. In alternative embodiments, data storage 180 may comprise alternative types of persistent storage. As such, the description of storage devices 180 comprising one or more disk drives should be taken as example only.

Storage devices 180 illustratively provide persistent storage of one or more data structures utilized by the messaging system 150. Some of the data structures that are persistently stored may also be stored in a volatile memory 165 for use by the messaging server application 200. In accordance with an embodiment of the present disclosure, the certain data structures, described further below in reference to FIGS. 3 and 4, may be maintained in memory 165 to avoid the need for repetitive disk access with its concomitant latency. Examples of data that may be persistently stored include a message repository 181, and accountable repository 182, a suggestion repository 183, a sessions data store 184, a statistics data store 185 and a co-occurrence data store 186.

Figure 2:
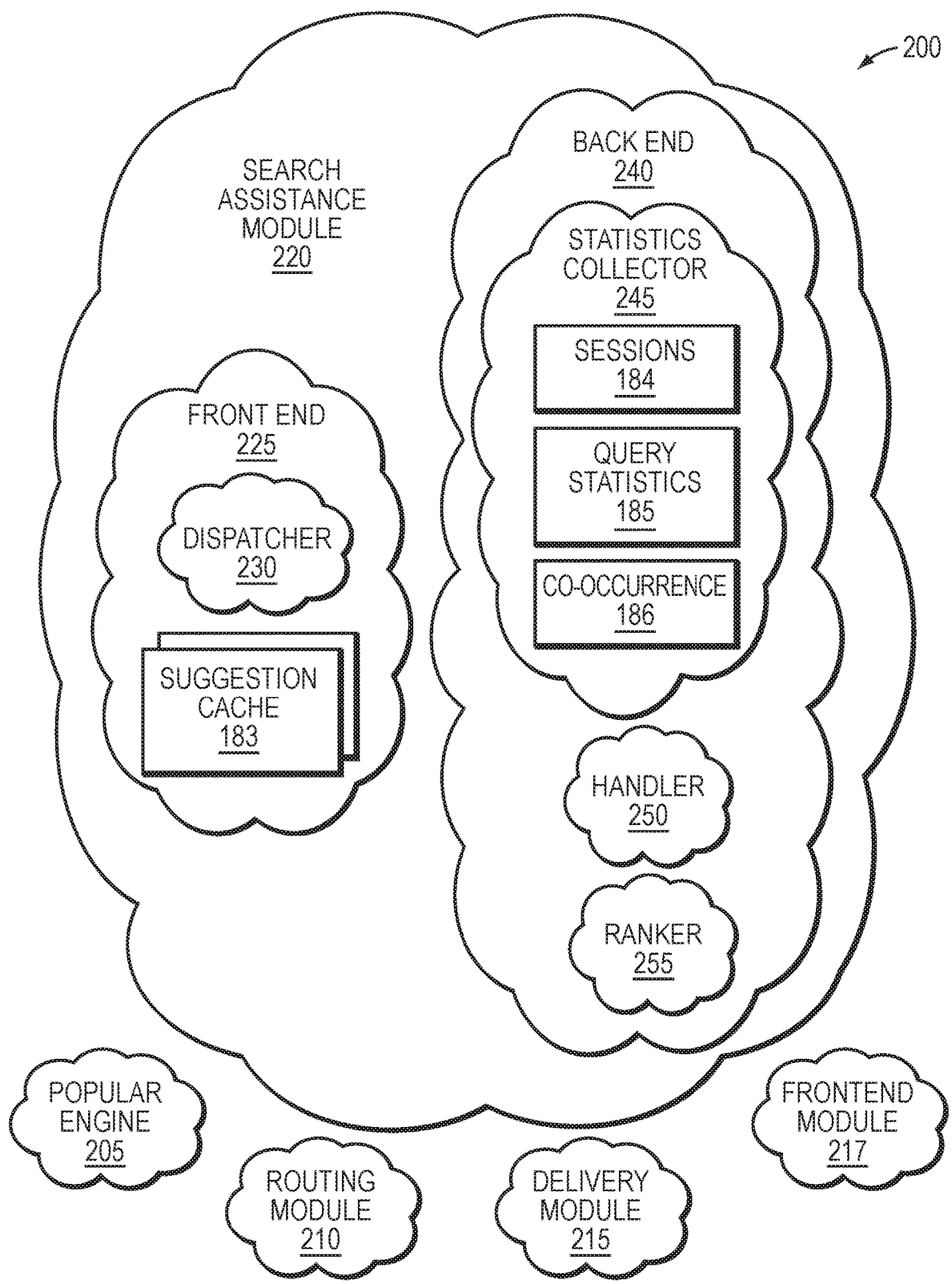
FIG. 2 is a schematic block diagram of an example search assistance module in accordance with an illustrative embodiment of the present disclosure.

FIG. 2 is a schematic diagram of an example messaging server application 200 in accordance with an illustrative embodiment of the present disclosure. The messaging server application illustratively comprises a plurality of modules including, for example, a popular engine module 205, a routing module 210, a delivery module 215, a front end module 217 and a search assistance module 220.

The popular engine module 205 illustratively includes functionality to identify popular messages based on, for example, social networking messages and selections of references to messages. The routing module 210 illustratively provides functionality to route messages received via the front end module 217 to appropriate storage or other modules within the messaging server application 200. For example, the routing module 210 may direct a message to the message repository 181 or, if the received input is relating to a query, to the search assistance module 220. The delivery module may be utilized by the routing module to effectuate data delivery either to storage, to users or to other modules. Illustratively, the front end module 217 provides functionality to interface with external entities, for example, client 110. The front end module 217 may include an application programming interface (API) and/or other components used for communicating with entities outside of the messaging server.

The search assistance module illustratively comprises of a front end module 225 and a backend module 240 that operate together to provide the search assistance functionality described herein. The front end module 225 illustratively comprises of a dispatcher module 230 as well as an in-memory store of the suggestion cache 183. Illustratively, the suggestion cache 183 is stored in core to enable substantially real-time access to suggestions by user. The front end module 225 provides the user accessible front end search assistance. For example, when a user enters a query, the query may be received initially by the front end module 225 via the routing and/or delivery modules 210, 215. The dispatcher module 230 illustratively forwards the new query or information relating to a query to the back end module 240 in order to update various statistics, as described below. However, the dispatcher module 230 may also examine suggestions within the suggestion cache 183 to provide one or more suggestions to a user in response to an entered query.

The backend module 240 illustratively comprises a statistics collector module 245, a handler module 250 and a ranker module 255. The statistics collector module 245 may maintain representations of the sessions data store 184, the query statistics data store 185 and a co-occurrence data store 186. The sessions store 184 keeps track of anonymized user sessions observed via a set of queries and for each the history of the queries issued recently. As will be appreciated by those skilled in the art, a session may be defined in any of a plurality of ways. Example techniques for defining a session may be based on a user login/logout procedure, a URL based definition, use of cookies in a web-based environment, user selections (e.g., a session may end when a user stops typing in queries and begins clicking on results) or a simple time based technique. An example time based session definition may be initiated when a user first inputs a query and ends when there has been no query for some predetermined time period. Illustratively, a time based technique is utilized with the teachings of the present disclosure. However, it is expressly contemplated that any technique for defining a session may be utilized in alternative embodiments. As such, the description of a time based technique should be taken as example only. Illustratively, the sessions data store 184 may comprise a linked list; however, in alternative embodiments any data structure may be utilized. The query statistics data store 185 maintains up to date statistics for individual queries. Example entries within the query statistics data store are described further below in reference to FIG. 3. The co-occurrence data store 164 is similar to the query statistics data store except that it holds data about pairs of co-occurring queries.

The ranking module 255 utilizes the various statistics collected by the statistics collector 245 to generate and rank suggestions that may be integrated into the suggestion cache 183. Illustratively, the ranker module 255 traverses the entire query statistics data store and generate suggestions for each query based on the various activity statistics. The suggestions are then maintained within the suggestion cache 183.

It should be noted that in accordance with alternative embodiments of the present disclosure, various functionality of the modules and/or data containers may be merged and/or modified from that described herein without departing from the spirit and scope of the present disclosure. For example, in an alternative embodiment, the search assistance module may not be divided between a front end module 225 and a backend module 240 but they instead be integrated as a single module. Thus, the description of the various modules and their arrangements should be taken as example only.

FIG. 3 is an example query statistics data structure 300 in accordance with an illustrative embodiment the present disclosure. Illustratively, the search assistance 220 maintains a query statistics data structure 300 for each query and co-occurrence that is being maintained by the search assistance module. Illustratively, the query statistics data structure 300 comprises a query data field 305, a count data field 310, a weighted count field 315, a decayed count field 320, a last seen count field 325 and, in alternative embodiments, additional fields 330. The query field 305 identifies the particular query or co-occurrence with which this particular data structure 300 is associated. In accordance with an illustrative embodiment of the present disclosure, the query statistics data structure 300 may not have a query field 305. In such embodiments, a list of queries or co-occurrences may be maintained by the search assistance module, with each entry linked to a query statistics data structure. As will be appreciated by those skilled in the art, a variety of techniques may be utilized to maintain the data described herein. As such, the specific data fields and organization of data structure 300 should be taken as example only.

The count field 310 maintains a count of the total number of user sessions in which the query or co-occurrence has been observed. That is, the count field 310 contains a count of the number of users that have resulted in this query occurring. The weighted count field 315 contains a weighted count associated the particular query. In accordance with an illustrative embodiment, each search type may have a weighting value associated with it. Thus, for example, if a user types in a search, a first weighting value may be associated with that query. A second weight value may be associated if a user selects a link, such as a hashtag within a message. For example, the second weighting value may be higher than the first weighting value, representing that if a user selects a link, that should be considered more important than simply typing in a query. In alternative embodiments, the weighting values may vary. Further, in alternative embodiments, a weighting value may be assigned to certain users, e.g., a very important user's queries are accorded more weight than an average user's queries. This enables a very important user's queries to be more quickly distributed and prevents them from being decayed as rapidly. Thus, various weighting factors may be associated with the types of queries. The weighted count field 315 stores the weighted count for the particular query.

The decayed count field 320 contains a current count value that is equal to the weighted count as modified by any decaying factors. Illustratively, the search assistance module may have one or more sets of decay rules, with each set of decay rules including one or more parameters. The decay rules may identify how particular queries should be decayed over time and eventually removed (or pruned) from the stored query/co-occurrence statistics. These decay rules may be associated with particular types of queries and/or co-occurrences. In alternative embodiments, queries and co-occurrences may have differing decay rule sets. Further, in alternative embodiments, counts may be decayed at differing weights depending on the source of a query. Illustratively, a set of decay rules includes a set of parameters including, for example, a decay interval, a decay rate and a pruning threshold. The decay interval identifies a time in which counts should be decayed. This may be configurable by a system administrator and may vary depending on types of queries and/or co-occurrences. That is, queries may have a first decay rate, while co-occurrence have a second decay rate. The first and second decay rates may be identical; however, in alternative embodiments, they may differ.

Illustratively, the decay rate is a numeric value that is multiplied by the current decayed count to achieve a new decayed count value. Illustratively, the decay rate is a value less than 1.0, i.e., after each multiplication, the decayed count will be reduced in value. In alternative embodiments, the decay rate may be a value that is subtracted from the current decayed count to obtain the new decayed account.

The pruning threshold parameter identifies a minimum decayed count value for a query to remain in the query statistics. That is, if a query's decayed count value falls below the pruning threshold, the query is removed from the query statistics. For example, assume that a decay interval is set at five minutes, a decay rate is set at 0.5 and the pruning threshold is set at 0.9. If the current indicated count field 320 contains a value of 3 at time 0, it would be decayed by the decay rate factor of 0.5 to a new decayed count of 1.5 (3×0.5) at time 5 (time 0 plus the decay interval of 5). At time 0+10, it would be further decayed to a decay count of 0.75 (1.5×0.5). As 0.75 is less than 0.9, the search assistance module would remove the particular query or co-occurrence. In this way the storage assistance module minimizes the size of data structures required to be stored. By limiting the size of data structures to be stored, the storage assistance module may maintain the various data structures in memory, thereby improving access times and enabling faster updates and operations. This enables substantially real time updates to occur. Further, by only examining the terms involved, but not looking into the meanings (semantic or otherwise), the system improves is update response speed to enable real time updates.

Figure 4:
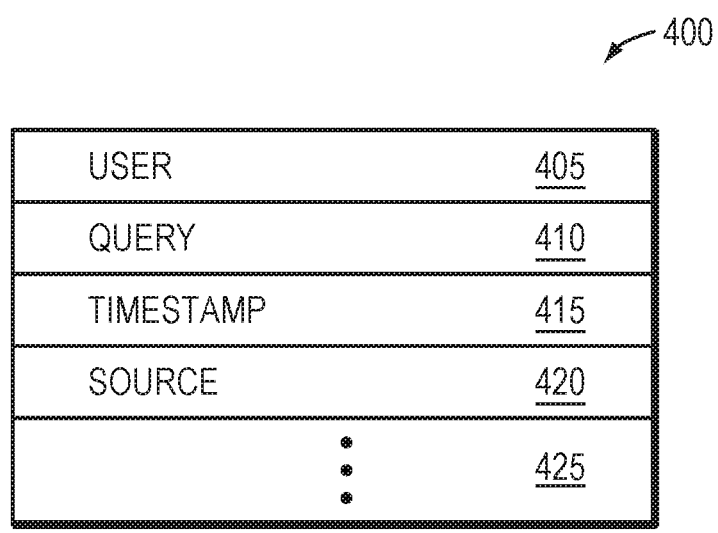
FIG. 4 is a schematic block diagram of an example query data structure in accordance with an illustrative embodiment of the present disclosure.

FIG. 4 is a example query data structure 400 in accordance with an illustrative embodiment of the present disclosure. The query data structure 400 illustratively comprises a user field 405, a query field 410, a timestamp field 415, a source field 420 and, in alternative embodiments, additional fields 425. The user field 405 contains the identifier of a particular user so that the search assistance module may associate the query with a user session store. In accordance with an illustrative embodiment of the present invention, the user identifier field 405 contains an anonymized identifier, i.e., the identifier cannot be used to directly identify a particular user by name, etc. The query field 410 contains the actual query or other search term. The timestamp field 415 contains a timestamp at which identifying when the query occurred. The timestamp is utilized by the search assistance module for aging and removing dated queries from the various data stores. The source field 420 identifies the type of query. Examples of types of queries may be a typed query, i.e., one entered by a user, a query resulting from selecting a portion of another message, such as a hyperlink and/or hashtag within the message, etc. As noted above, differing weighting values may be given to queries based on how they were entered, e.g., typed versus selection of a link, etc.

Figure 5:
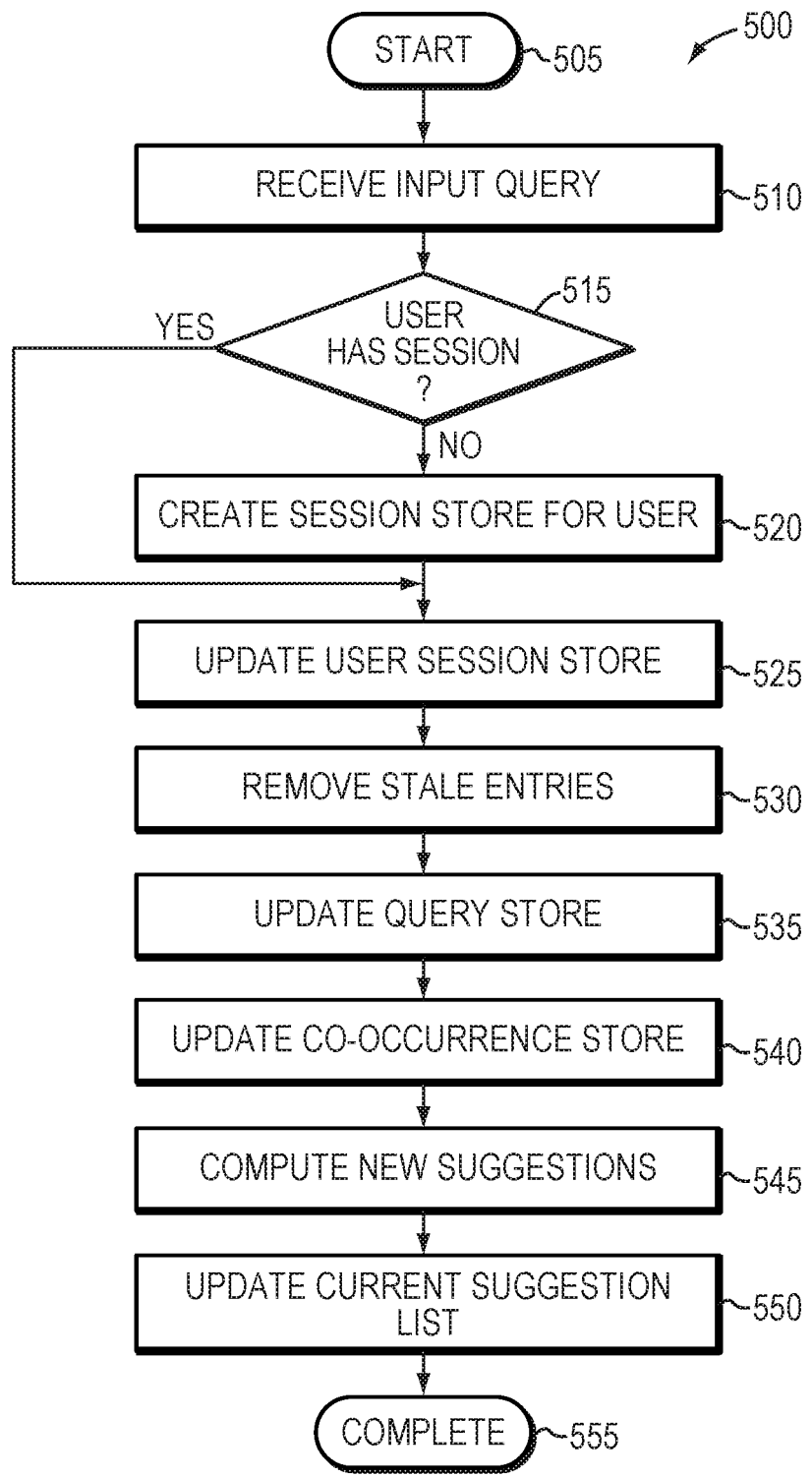
FIG. 5 is a flowchart detailing the steps of a procedure for updating a suggestion list in accordance with an illustrative embodiment the present disclosure.

FIG. 5 is a flowchart detailing the steps of the procedure 500 for updating a suggestions list in accordance with an illustrative embodiment the present disclosure. The procedure 500 begins in step 505 continues to step 510 where a search assistance module receives an input query. The input query may be received by, for example, the front end module 225 of the search assistance module 220. The query may be received by, e.g., a user typing in a query, selecting a hashtag or other link within a message, etc. It should be noted that the procedure operates the same regardless of the source of the query; however, in certain embodiments, differing weighting values may be assigned based on how a query is received.

Once the query has been received in step 510, a determination is made whether the user associated with the query already has a session in step 515. If the user does not have a session, a session store is created for the user in step 520. The user session store is then updated in step 525 using information from the received query. However, if in step 515, it is determined that the user already has a session, the procedure continues directly to step 525 to update the user session store. Illustratively, the user session store is updated to reflect the newly received query.

Stale entries are then removed in step 530. Illustratively, queries that are within the user session store older than a predefined time value are removed. This is performed to enable the user session store to reflect the most recent queries and to avoid the various data stores becoming too large to be maintained in memory. In step 535, the query store is updated using data from the received query. Illustratively, an entry is entered into the query store for the query if there is not an entry. If there is an entry for the query, the count is updated to reflect that the query has appeared again. Then, in step 540, the co-occurrence store is updated. Similar to step 535, the co-occurrence store is update with either a new entry or an increased count relating to a co-occurrence to reflect the recently received co-occurrences. New suggestions are then computed in step 545. Suggestions may be computed by analyzing the recent queries and co-occurrences to identify queries that are related to each other. For example, if queries A and B are often seen in relation to each other, B may be made a suggestion of A (and vice versa). The current suggestion list is then updated in step 550. Illustratively, for each active user session, a current suggestion list is maintained based on the computed suggestions from recent queries received. The current suggestion list may be utilized to provide suggestions as described further below in reference to FIG. 7. The procedure 500 then completes in step 555.

The procedure 500 is illustratively implemented by the various modules of the various modules of the search assistance module 220. This may be implemented by, for example, a computer readable medium executing on processor 160. The processor may implement procedure 500 by executing computer software to implement the procedure. The following example pseudocode illustrates the implementation of procedure 500:

private final Map<Long, UserSession>userSessionInfoMap=new HashMap<Long, UserSession>( );
private final QueryCooccurrenceStore queryCooccurrenceStore;
public boolean addQueryInstance(long userId, QueryInstance queryInstance) {
// add the user if not present in the store
userSessionInfoMap.putIfAbsent(userId, new UserSession (userId));
// get the session for a user
UserSession session=userSessionInfoMap.get(userId);
// Remove old queries in this user's session
long timestamp=queryInstance.getTimestamp( )

```
session.removeOlderThan(timestamp—sessionLengthM-
secs);
// increment counts for all cooccurrences from this user's
session
for (QueryInstance prevQueryInstance: session) {
String currQuery=queryInstance.getQuery( )
String prevQuery=prevQueryInstance.getQuery( )
queryCooccurrenceStore.increment(prevQuery, currQuery);
}
// add new query to the session
session.addQueryInstance(queryInstance);
}
// - - - Following is pseudocode in QueryCooccurrenceStore
- - -
private final Map<String, Set<String>>followedBy; // This
contains the suggestions for a given query string
// The increment function looks like this:
public void increment(String prevQuery, String currQuery)
{
Pair<String, String>queryPair=Pair.of(prevQuery, currQu-
ery);
Set<String>followedByQueries=followedBy.get(prev-
Query); followedByQueries.put(currQuery);
followedBy.put(prevQuery, followedByQueries);
}
```

It should be noted that the example pseudocode illustrates one implementation of the technique. In accordance with alternative embodiments, differing implementations may be utilized. As such, the pseudocode should be taken as example only.

FIG. 6 is an example chart illustrating how the various data stores may change over time. Example chart 600 includes an input column 605, a user sessions store column 610, a query store column 615 and a co-occurrence store column 620. Each column represents the contents of the respective data store as various events, described below, occur. In the example chart 600, the following parameters are utilized:

Session Length 5 time units
Decay Rate 0.5
Pruning Threshold 0.9

An initial query (query A) is received at timestamp 100 from user number 1. In response, the search assistance module updates the session store and query store to show the query. At time 101, a second query is received from user 1. The session store is updated to indicate that, within this session, user 1 has searched for A and B. Further, the query store is updated to indicate that there has been one search for A and one search for B. As searches A and B occurred consecutively, the co-occurrence store is also updated to indicate that there is one co-occurrence, namely (A, B).

If at time 102, the user 1 enters the same query (B), the session store is updated to reflect the received queries are (A,B,B). Further the query store count is updated for query B as well as the co-occurrence count. Additionally, if at time 102, a second user inputs a query for A, a new user session is generated for user number 2. Further, in response to that query, the count associated with A is updated in the query store. Then, at time 103, the second user inputs a query for B, the user session store is updated for user number 2. Additionally, the query store would be updated to reflect a third occurrence of the query for B. Similarly, the co-occurrence count would be updated for the (A,B) co-occurrence.

An out of order query may be received, for example, a query (C) having a timestamp of 101 associated with user 2. In such a case, the user session store is updated to reflect the appropriate ordering. That is, the user session store for user 2 to is reflected to show (C, A, B) as the order of queries received. The session store would be updated. Further, two additional co-occurrences would be integrated to the co-occurrence store, namely (C, A) and (C,B), with their appropriate counts updated. At time 105, a decay and pruning cycle is performed. Illustratively, all of the counts within the query store are multiplied by the decay factor of 0.5. Thus, the A count, which had a value of 2, becomes a count of 1 (2×0.5=1) The count for B would become 1.5 (3×0.5=1.5). The C count had a value of 1. After the decaying rule it would have a value of 0.5, which is less than the pruning threshold of 0.9. Because of this, query C would be removed from the query store. Similarly, the (C,A) and (C,B) co-occurrences would be removed and pruned from the co-occurrence store. The (A,B) co-occurrence would be retained with a decayed value of 1.5.

As will be appreciated from the above example, the weightings and contents of the data stores are dynamically updated in response to each received query. By implementing the pruning mechanism, the size of the data stores may be kept at a reasonable level so that they may remain in memory and not need to be stored on-disk. This provides significant performance improvements, which is advantageous when a massive number of messages are being transmitted due to, e.g., a major event occurring. This enables substantially real time search suggestions to be made.

Figure 7:
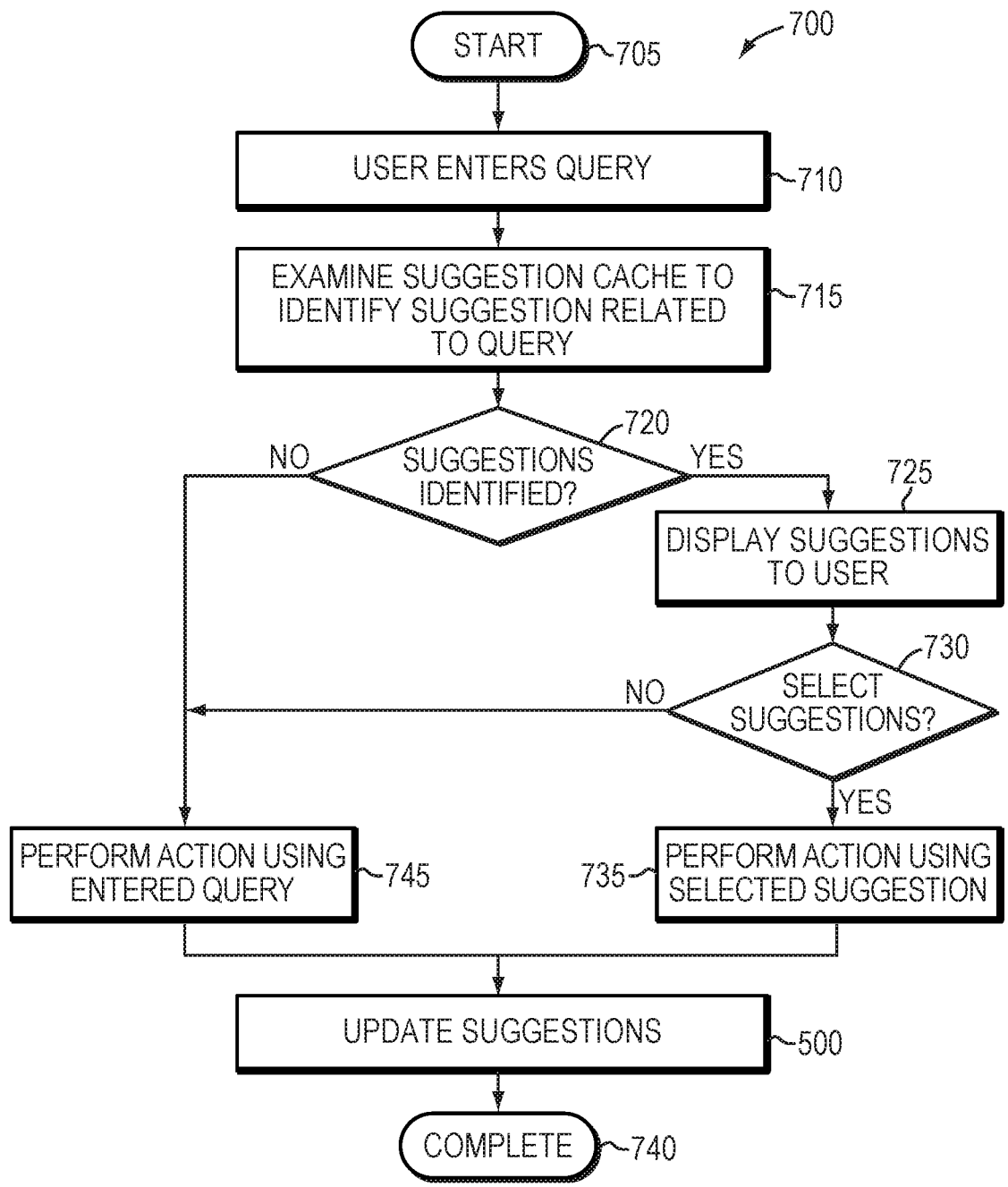
FIG. 7 is a flowchart detailing the steps of a procedure for providing search assistance in accordance with an illustrative embodiment of the present disclosure.

FIG. 7 is an example flowchart detailing the steps of a procedure 700 for providing suggestions in accordance with an illustrative embodiment of the present disclosure. Procedure 700 begins in step 705 and continues to step 710 where a user enters a query. Illustratively, the query may be entered by, e.g., typing in a query, beginning the input of a message, selecting a link and/or hashtag within a message, etc. In response to the user entering the query, the storage assistance module examines the suggestion cache to attempt to identify any suggestions that are related to the query in step 715. That is, the current suggestion cache may be examined to determine whether any suggestions that exist within the cache are related to the entered query. A determination is made in step 720 whether any suggestions have been identified. That is, a determination is made whether a related query exists within the suggestions cache to the entered query. If so, the suggestions are displayed to the user in step 725. The user may decide to select one of the suggestions in step 730. If the user selects one of the suggestions, the procedure continues to set step 735 where an action is performed using the selected suggestion. This may be the execution of a search, the generation of a message using the suggestion, etc. Once the action has been performed, the suggestions cache may then be updated in accordance with step 500 (FIG. 5). The procedure then completes in step 740.

However if in step 720 no suggestions have been identified, the procedure branches to step 745 to perform the action using the entered query. The suggestions are then updated in step 500 before the procedure completes in step 740. As will be appreciated by those skilled in the art, each query entered is processed in accordance with procedure 500 to continually update the various data stores and suggestion cache in substantially real time. This enables the messaging system to provide suggestions that are related to events as they occur without a delay from the time when queries first start appearing.

Example procedure 700 may be implemented as non-transitory computer readable medium executed by processor 160 as part of the search assistance module 220. The following pseudocode illustrates an example implementation of procedure 700:
// First, the pseudocode that returns suggestions for a query through a lookup private final QueryCooccurrenceStore queryCooccurrenceStore;
public Set<String>getRelatedQuerySuggestions (String query) {return (queryCooccurrenceStore.getFollowedBy( ).get(query);
}
// Note that the user actions come back through an update pipeline, and we consider two scenarios:
// 1. If the above returns some suggestions, and the user u clicks on a suggestion suggQuery then effectively we will call the "addQueryInstance" function again with u and suggQuery as the parameters. This will link query and suggQuery even more strongly (we actually store weights which are not provided in the above pseudocode for brevity).
// 2. Suppose the above doesn't return any suggestions, then the user u still might manually enter a new query newQuery. Then, we'll call the "addQueryInstance" function with u and newQuery as the parameters. We note that this will link query and newQuery together since they are in the same user session.

It should be noted that the example pseudocode illustrates one implementation of the technique. In accordance with alternative embodiments, differing implementations may be utilized. As such, the pseudocode should be taken as example only.

It should be noted that the various descriptions and embodiments described herein are example only. The various aspects of the disclosure may be implemented in software, such as a non-transitory computer readable medium executing on a processor, hardware, firmware or any combination thereof. For example, a non-transitory computer readable medium can be configured with instructions to perform one or more of the steps is described in relation to the procedures contained herein. Further, while this description is written in reference to particular operating systems, client devices and/or messaging platforms and messages, one skilled in the art will appreciate the functionality may be implemented in differing environments.

What is claimed is:

1. A messaging platform comprising:
a processor executing a messaging server, the messaging server including a search assistance module;
a memory operatively interconnected with the processor, the memory including a suggestion data store storing a current list of suggestions and a query data store storing:
a set of received queries, each received query associated with a query count,
a co-occurrence data store storing a set of co-occurrences, each co-occurrence associated with a co-occurrence count, and
one or more user session data stores;
wherein the search assistance module is receives a query data structure having a source identifier and updates the query data store, the co-occurrence data store, and one of the one or more user session data stores using content of the query data structure;
wherein the search assistance module is configured to:
decay each query count according to a first set of decay rules to produce decayed query counts,
remove a selected received query, associated with a selected decayed query count, from the query data store in response to the selected decayed query count being less than a query pruning threshold,
decay each co-occurrence count according to a second set of decay rules to produce decayed co-occurrence counts,
remove a selected co-occurrence, associated with a selected decayed co-occurrence count, from the co-occurrence data store in response to the selected decayed co-occurrence count being less than a co-occurrence pruning threshold,
whereby the first and second set of decay rules enables the suggestion data store, the query data store and the one or more user session data stores to be stored in memory for increased execution speed.

2. The messaging platform of claim 1 wherein the search assistance module utilizes the source identifier to determine which of the first set of decay rules is applied.

3. The messaging platform of claim 1 wherein the source identifier determines which of the second set of decay rules is applied.

4. The messaging platform of claim 1 wherein the search assistance module executes one or more of the first set of decay rules in parallel.

5. The messaging platform of claim 1 wherein the search assistance module is further configured to analyze the query data store and the co-occurrence data store to generate a list of one or more suggestions and stores the one or more suggestions in a current suggestions data structure.

6. The messaging platform of claim 5 wherein the search assistance module, upon receipt of a new query, is further configured to identify a set of related suggestions from the current suggestions data structure, wherein the set of related suggestions are related to the new query.

7. The messaging platform of claim 6 wherein each received query is associated with a weighted query count and the search assistance module is further configured to update the weighted query count in response to receiving a query data structure.

8. The messaging platform of claim 7 wherein a first weighting value is applied to the weighted query count in response to the query data structure being generated by an entered search query.

9. The messaging platform of claim 8 wherein a second weighting value is applied to the weighted query count in response to the query data structure being generated by selecting a link.

10. A computer implemented method comprising:
receiving, by a search assistance module executing on a processor, a query data structure having a query, a user identifier, a timestamp identifier, and a source identifier;
updating, by the search assistance module, an in-memory query data structure to reflect the received query data structure, the query data structure comprising one or more query entries, each query entry associated with a received query, each query entry comprising a query count associated with the received query;
updating, by the search assistance module, an in-memory co-occurrence data structure to reflect the received query data structure, the co-occurrence data structure comprising one or more co-occurrence entries, each co-occurrence entry associated with a received query, each co-occurrence entry comprising a co-occurrence count associated with the received query computing a current list of suggestions using the query data structure and the co-occurrence data structures;

implementing, at one or more predefined query decay times, one or more of a set of query decay rules, the one or more query decay rules configured to reduce the query count, of a set of query entries matching a set of query decay parameters, to produce decayed query counts;

removing a selected query entry of the set of query entries from the query data structure in response to a selected decayed query count, associated with the selected query entry, being less than a query pruning threshold;

implementing, at one or more predefined co-occurrence decay times, one or more of a set of co-occurrence decay rules, the one or more co-occurrence decay rules configured to reduce the co-occurrence count, of a set of co-occurrence entries matching a set of co-occurrence decay parameters, to produce decayed co-occurrence counts; and removing a selected co-occurrence entry of the set of co-occurrence entries from the co-occurrence data structure in response to a selected decayed co-occurrence count, associated with the selected co-occurrence entry, being less than the a co-occurrence pruning threshold.

11. The computer implemented method of claim 10 wherein the one or more query decay rules are configured to multiply one or more of the query counts by a query decay factor.

12. The computer implemented method of claim 10 further comprising:

analyzing the query data store and co-occurrence data store to generate a set of suggestions; and storing the generated set of suggestions in a current suggestions data structure.

13. The computer implemented method of claim 12 further comprising:

identifying, using the current suggestions data store, a set of related suggestions that correspond to a query; and providing the set of related suggestions to the user.

14. The computer implemented method of claim 13 further comprising:

selecting, by the user, a suggestion from the set of related suggestions; and performing an action using the selected suggestion from the set of related suggestions provided to the user.

15. The computer implemented method of claim 10 further comprising:

associating each received query with a weighted query count; and updating the weighted query count in response to receiving a query data structure.

16. The computer implemented method of claim 15 wherein associating each received query with the weighted query count comprises applying, in response to the query data structure being generated by an entered search query, a first weighting value to the weighted query count.

17. The computer implemented method of claim 16 wherein associating each received query with the weighted query count comprises applying, in response to the query data structure being generated by selection of a link, a second weighting value to the weighted query count.

18. A non-transitory computer readable medium comprising program instructions configured to execute on one or more computer processors to enable the one or more computer processors to:

received a query data structure having a query, a user identifier, a timestamp identifier, and a source identifier;

update an in-memory query data structure to reflect the received query data structure, the query data structure comprising one or more query entries, each query entry associated with a received query, each query entry comprising a query count associated with the received query;

update an in-memory co-occurrence data structure to reflect the received query data structure, the co-occurrence data structure comprising one or more co-occurrence entries, each co-occurrence entry associated with a received query, each co-occurrence entry comprising a co-occurrence count associated with the received query;

compute a current list of suggestions using the query data structure and the co-occurrence data structures;

implement, at one or more predefined query decay times, one or more of a set of query decay rules, the one or more query decay rules configured to reduce the query count, of a set of query entries matching a set of query decay parameters, to produce decayed query counts;

remove a selected query entry of the set of query entries from the query data structure in response to a selected decayed query count, associated with the selected query entry, being less than a query pruning threshold;

implement, at one or more predefined co-occurrence decay times, one or more of a set of co-occurrence decay rules, the one or more co-occurrence decay rules configured to reduce the co-occurrence count of a set, of co-occurrence entries matching a set of co-occurrence decay parameters, to produce decayed co-occurrence counts; and remove a selected co-occurrence entry of the set of co-occurrence entries from the co-occurrence data structure in response to a selected decayed co-occurrence count, associated with the selected co-occurrence entry, being less than the a co-occurrence pruning threshold.

* * * * *